(12) United States Patent
Baker et al.

(10) Patent No.: US 7,751,612 B2
(45) Date of Patent: Jul. 6, 2010

(54) OCCLUSIONLESS SCANNER FOR WORKPIECES

(75) Inventors: Lyle Baker, Salmon Arm (CA); Carl Flatman, Salmon Arm (CA)

(73) Assignee: USNR/Kockums Cancar Company, Vancouver, WA (US)

( * ) Notice: Subject to any disclaimer, the term of this patent is extended or adjusted under 35 U.S.C. 154(b) by 920 days.

(21) Appl. No.: 11/544,565

(22) Filed: Oct. 10, 2006

(65) Prior Publication Data

US 2008/0085047 A1   Apr. 10, 2008

(51) Int. Cl.
*G06K 9/00* (2006.01)

(52) U.S. Cl. ................. 382/152; 250/208.1; 356/237.1; 382/190

(58) Field of Classification Search .................. 382/141, 382/152
See application file for complete search history.

(56) References Cited

U.S. PATENT DOCUMENTS

| | | | |
|---|---|---|---|
| 4,149,089 A | | 4/1979 | Idelsohn et al. |
| 4,221,974 A | | 9/1980 | Mueller et al. |
| 4,803,371 A | * | 2/1989 | Durland .................... 250/559.2 |
| 4,820,932 A | | 4/1989 | Miller |
| 4,954,891 A | | 9/1990 | Burk et al. |
| 5,325,443 A | | 6/1994 | Beatty et al. |
| 5,414,268 A | * | 5/1995 | McGee ................... 250/559.26 |
| 5,544,757 A | * | 8/1996 | Geiger et al. ................ 209/518 |
| 5,644,392 A | * | 7/1997 | Soest et al. ............... 356/237.1 |
| 6,122,065 A | * | 9/2000 | Gauthier ..................... 356/394 |
| 6,529,270 B1 | * | 3/2003 | Bills ........................ 356/237.2 |
| 6,624,883 B1 | | 9/2003 | Zhou et al. |
| 6,858,826 B2 | * | 2/2005 | Mueller et al. ........... 250/208.1 |
| 7,030,400 B2 | | 4/2006 | Rivera et al. |
| 2004/0144760 A1 | * | 7/2004 | Cahill et al. ........... 219/121.68 |
| 2006/0050499 A1 | | 3/2006 | Yoneda et al. |
| 2006/0056659 A1 | * | 3/2006 | Laurent et al. .............. 382/110 |

FOREIGN PATENT DOCUMENTS

| | | |
|---|---|---|
| CA | 2 504 245 | 10/2006 |
| EP | 1 712 897 A1 | 10/2006 |
| WO | WO 2006/135898 A2 | 12/2006 |

* cited by examiner

*Primary Examiner*—Gregory M Desire
(74) *Attorney, Agent, or Firm*—Schwabe, Williamson & Wyatt

(57) ABSTRACT

An occlusionless scanner for sequentially scanning a series of workpieces translating in a downstream flow direction wherein the workpieces flow sequentially to the scanner on an infeed conveyor and sequentially from the scanner on an outfeed conveyor and across an interface between the infeed conveyors and the outfeed conveyors wherein scanner cameras are mounted so as to not interfere with one another nor to interfere with the conveyors to provide for the gathering of individual partial images of the workpiece by the individual scanner cameras so as to allow a processor to assemble a collective image of the partial images.

20 Claims, 14 Drawing Sheets

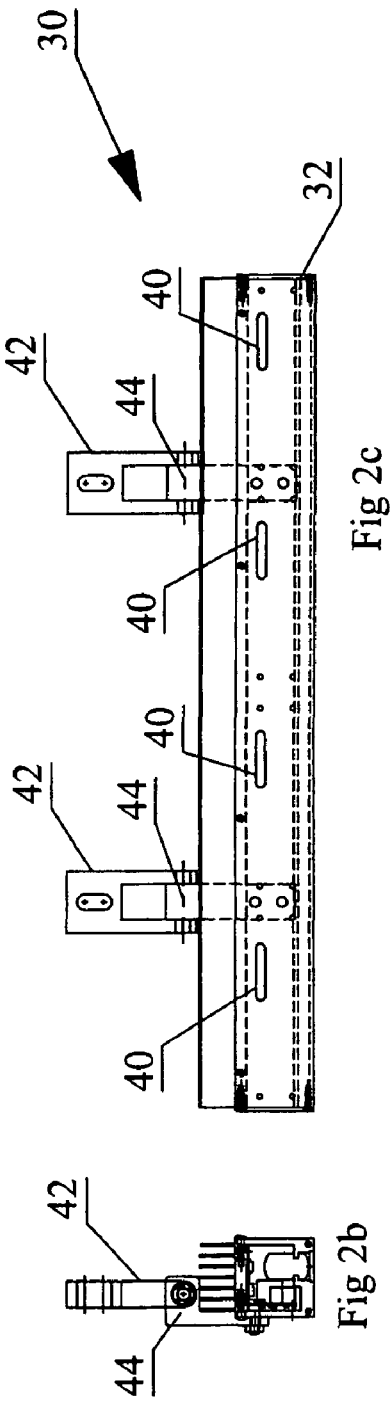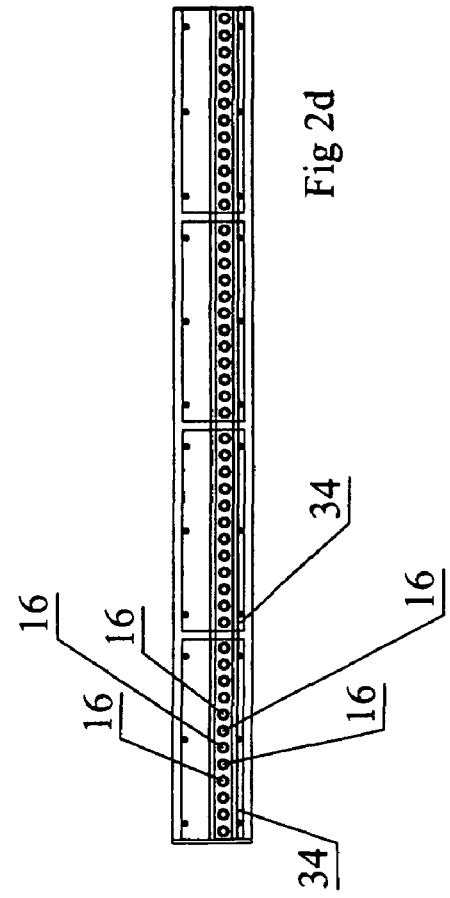

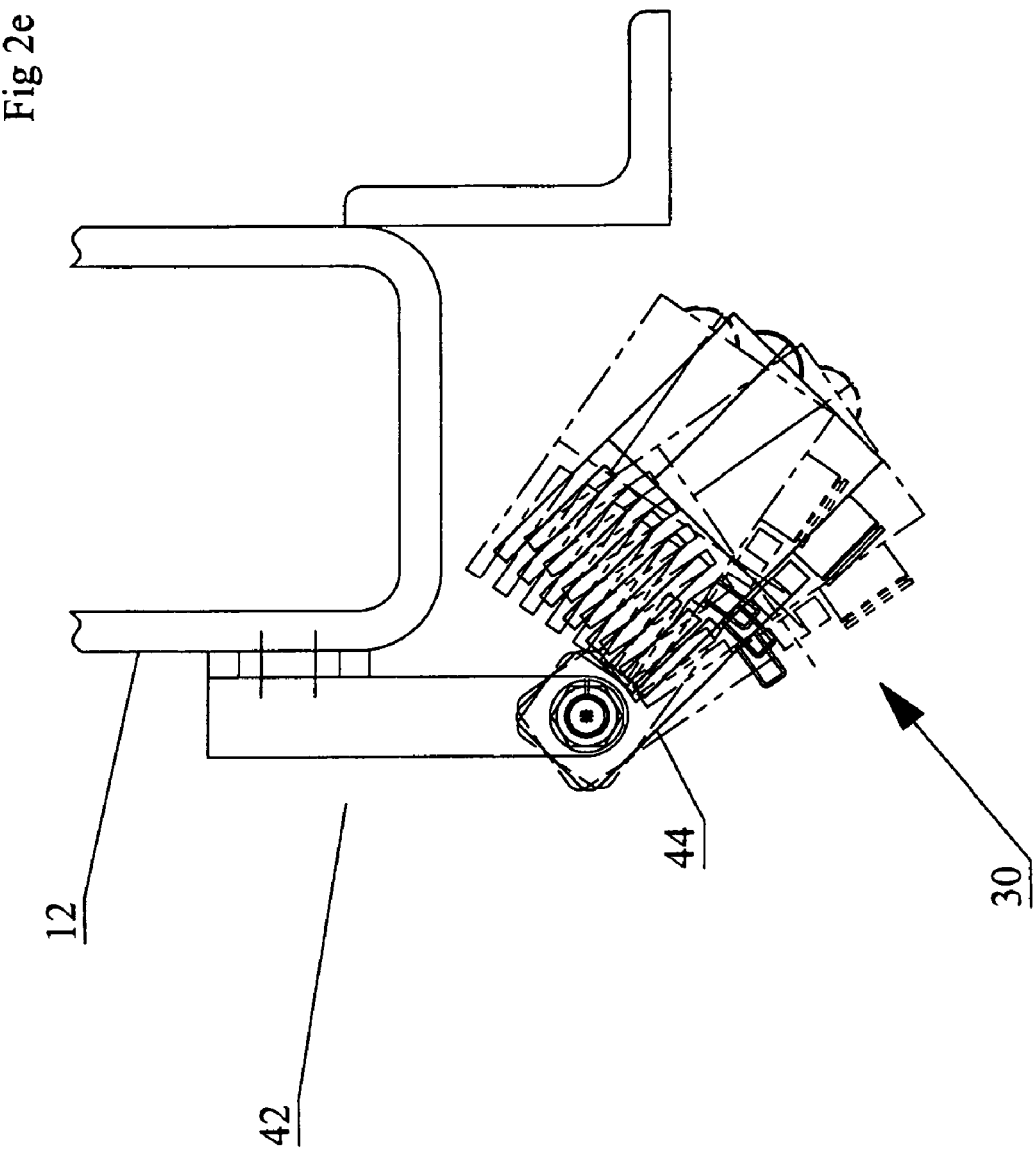

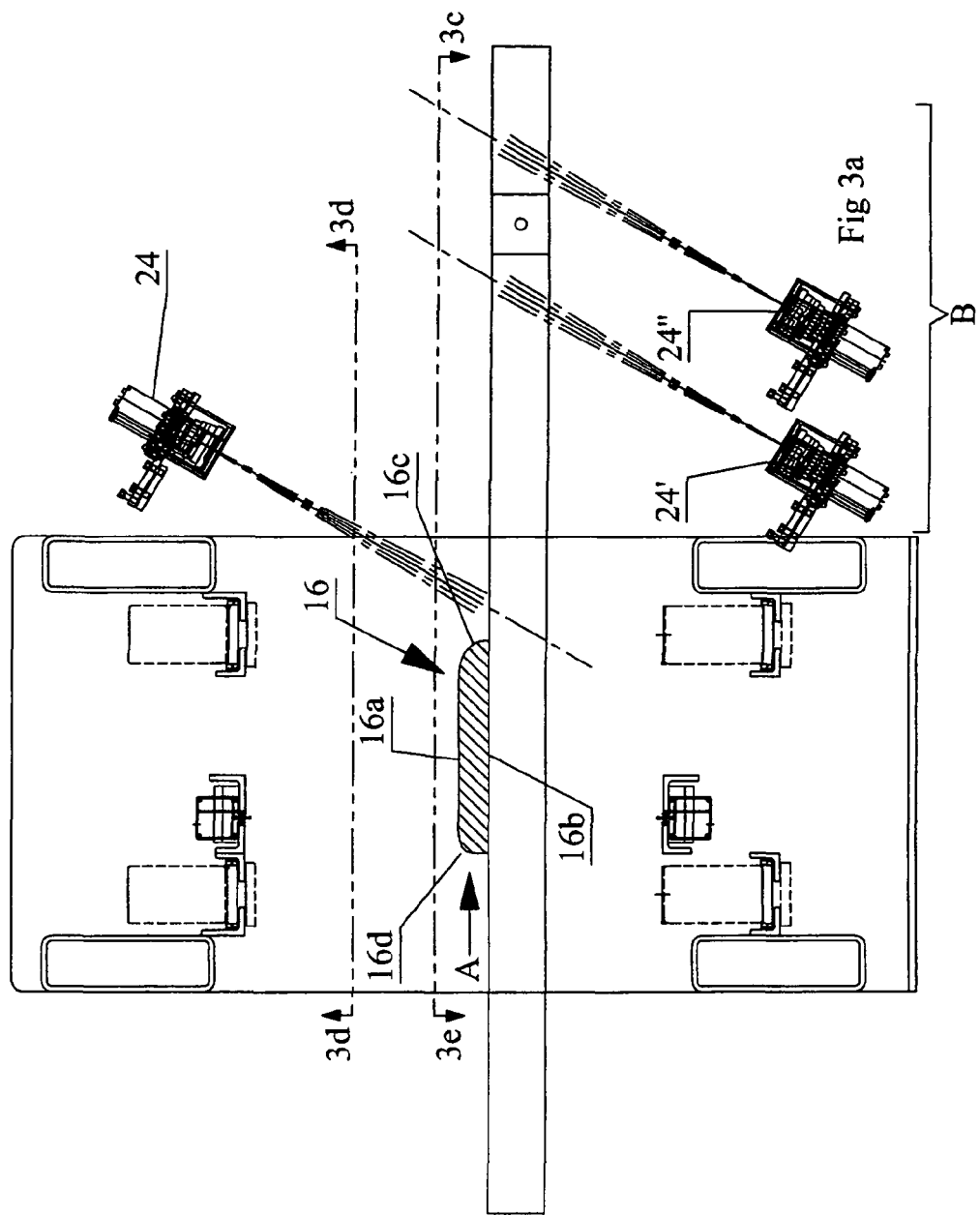

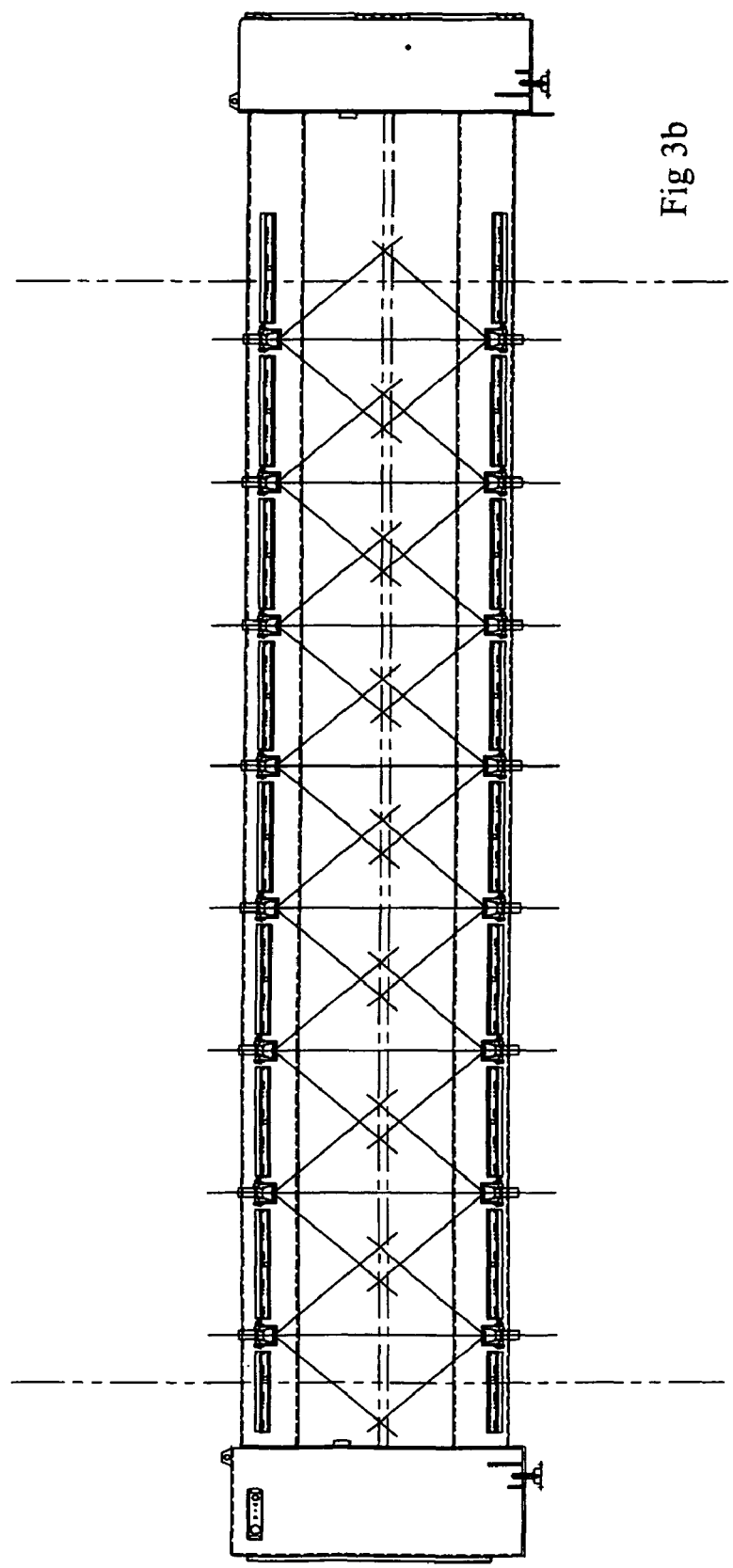

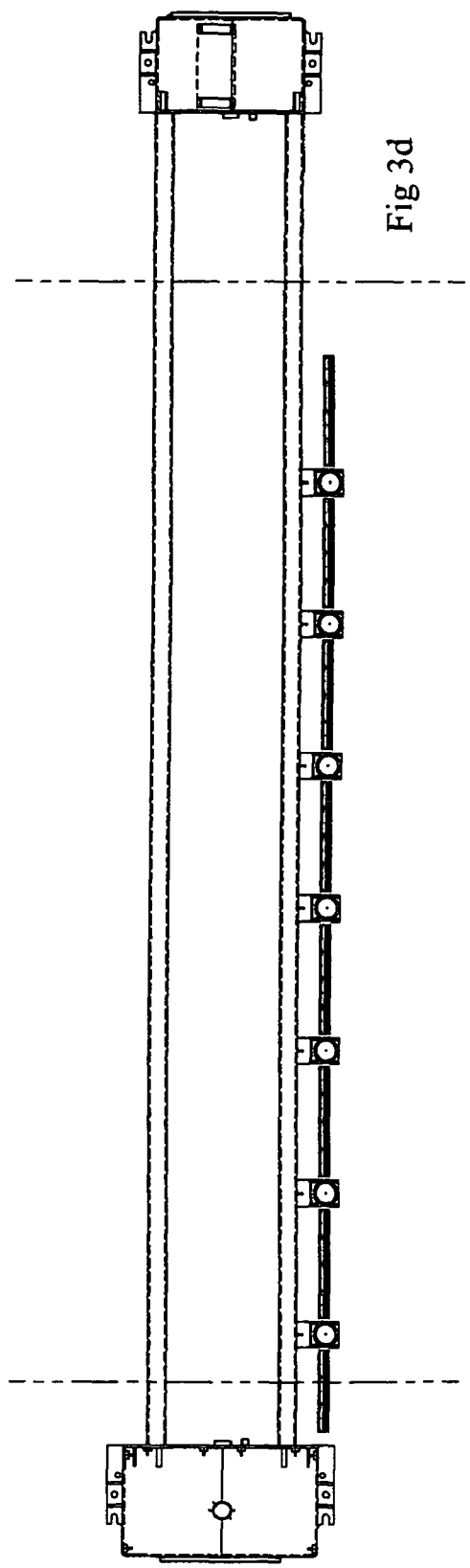

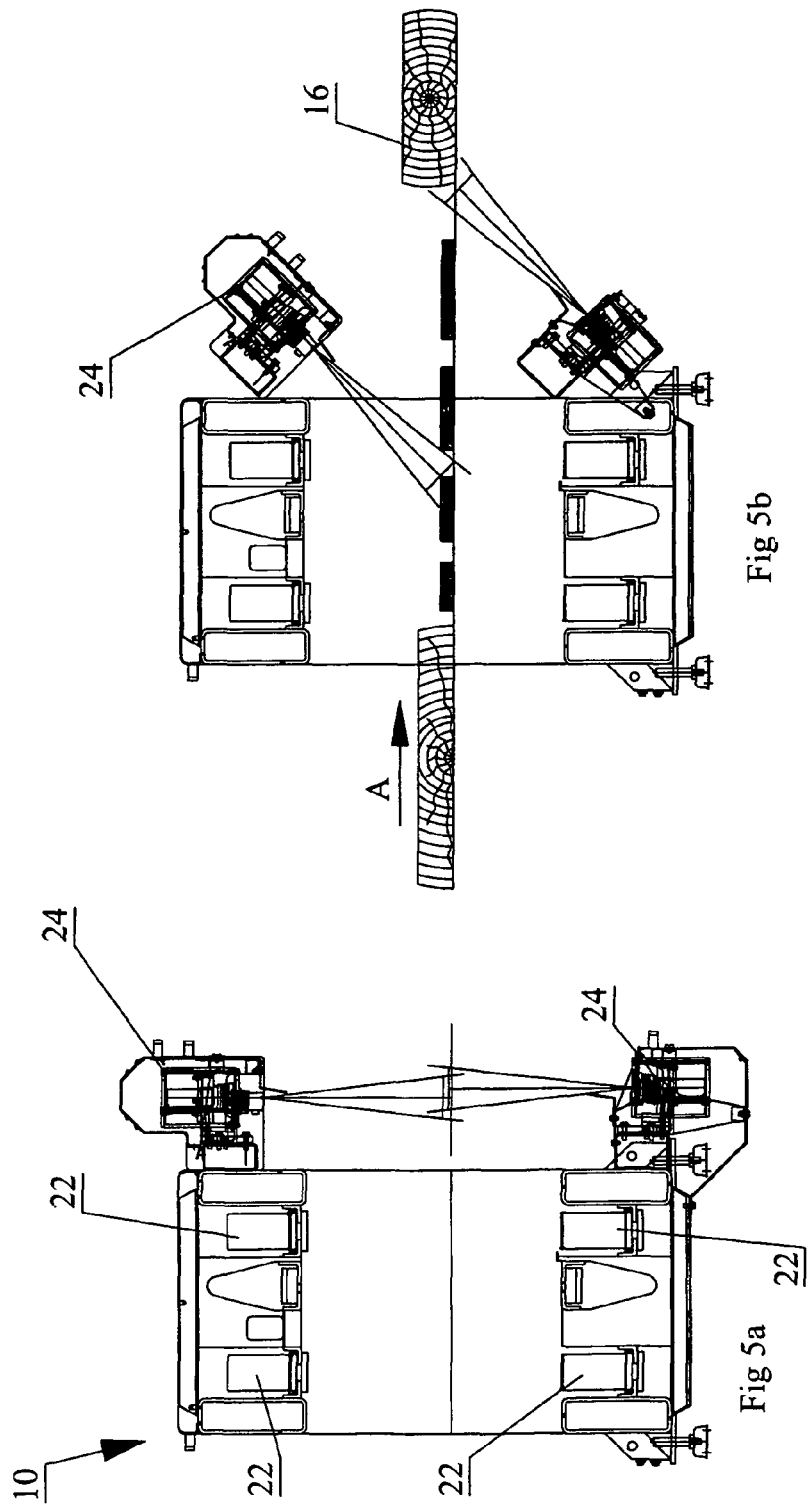

OCCLUSIONLESS SCANNER FOR WORKPIECES

FIELD OF THE INVENTION

This invention relates to the field of scanners and in particular to a scanner for workpieces such as lumber workpieces wherein the scanner includes scanners arranged so as to collect comprehensive images of the workpiece notwithstanding partial occlusion by the workpiece transfers.

BACKGROUND OF THE INVENTION

It is known in the prior art relating to scanners to scan workpieces such as flitches in a sawmill to detect defects such as stain, shake, knots, etc using so-called vision scanners and to map the profile of a workpiece including any wane edges. The results of such scanning is used to assist in optimizing further processing of the workpiece to recover the highest value and/or volume of pieces cut from the workpiece.

Scanners for use in sawmills, planermills, logdecks, engineered wood product machine centres such as veneer scanning, panel scanning and the like, or in other wood applications, may scan either lineally, that is, sequentially along the length of the workpiece as the workpiece is translated longitudinally through the scanner, or transversely, that is, simultaneously along the length of the workpiece as the workpiece passes through the scanner with the workpiece aligned transversely or laterally across the direction of flow of workpieces through the scanner. In the case of transverse scanning, conventionally the workpieces are delivered on an infeed such as an infeed employing a spaced apart parallel array of lugged transfer chains, smooth chains, belted transfers, etc. so as to pass each workpiece separately through a generally rectangular frame mounted laterally over and around the end of the infeed transfer. The scanner cameras and corresponding sources of illumination, such as halogen lamps, are typically mounted in the frame, often so as to simultaneously view both the top and bottom surfaces of the workpiece as the workpiece passes between the upper and lower beams or arms of the frame. Each camera has a pixel array aligned in a known orientation relative to the workpiece, for example aligned along the length of the workpiece. Light from the corresponding light sources is reflected from the surface of the workpiece and focussed by the camera lens onto the pixel array.

If the scanner is a profiling scanner, upper and lower triangulation geometry is used to arrive at a differential thickness measurement of the workpiece from movement of the focussed light along the array of pixels in the upper and lower cameras, from which a profile of the workpiece is modelled by an associated processor as a wireframe profile image. The accuracy or resolution of the wireframe model is influenced by the scan density, that is, the number of cameras and associated light sources, each of which generate the profile of a cross-section of the workpiece; the more closely spaced cross-sections, the higher the scan density and the better the accuracy or resolution of the wireframe model of the workpiece. The wireframe model of the workpiece is used by an optimizer, that is, a processor running optimization software, to determine optimized downstream cutting solutions for optimized recovery from the workpiece.

If the scanner is a vision scanner, the cameras, rather than being used to generate workpiece profile measurements, provide color and/or contrast data from the workpiece exterior surfaces within the field of view of each camera as the workpiece translates through the scanner. The color and/or contrast data is processed to generate predictions of the type and location of visually detectable defects on the workpiece surfaces. Defects may include holes, splits, shake, pitch pockets, knots, bark or wane, stain, etc.

It is understood that the present description of the background of the invention is not intended to limit the scope or ambit afforded the claims directed to the present invention as the background description merely reflects applicant's understanding of the present state of the art of wood processing. For example, the present invention is not intended to be restricted to either only vision scanning or profiling scanning or a combination of vision and profile scanning, whether in separate or in a single device or scanning package, as the present invention is intended to also include other forms of scanning such as multi-spectral, x-ray, microwave, etc.

SUMMARY OF THE INVENTION

In so-called defect extraction, the type and location of defects on a workpiece are predicted by software based on data from one or more scanners. The data from vision and profiling scanners, or other forms of scanning, may be used in a complimentary fashion to aid in defect extraction. For example, profile information may aid in determining whether a dark spot on the surface of a board is a bark pocket, a smooth knot or a hole. In the present invention it has been found advantageous to mount both vision scanners and profile scanners on a common frame so as to reduce cost and floor-space requirements, although separate frames may be employed. If scanning of a workpiece by both vision and profiling scanners may be done near simultaneously, then defect extraction is aided by minimizing mis-alignment of the workpiece between the scanners so as to minimize mis-alignment of the vision and profile data and increasing the available data processing time before a cutting decision must be implemented by the programmable logic controllers (PLCs) instructing the actuators actuating the downstream cutting devices. In particular, and by way of example, the following methods of implementation may be employed: the optimizer may hand off control information to the PLC for actuation; or the optimizer processor may control discrete input/output for direct control of the actuators. Alternatively, the PLC may itself optimize and actuate the actuators.

One of the problems with mounting both vision and profiling scanners in a common frame is interference between the two scanners. For example, if there is not a common light source for both scanners, and if the light source for one scanner is emitting light in a frequency which is within the detected frequency range of the other scanner, then the light source from the former scanner will interfere with the camera of the latter scanner. For example, in one known arrangement in a scanning machine the lines of laser light used as a light source by the profile scanning cameras extend in a parallel spaced apart array in cross-sections over the workpiece along the length of the workpiece. The laser light used may be in the visible spectrum, for example red, or for example in the infra-red. Vision scanning cameras may detect the reflected stripes of laser light across the workpiece depending on their spectrum. This may interfere with the vision scanning camera processing the broad spectrum of reflected light ordinarily impinging the pixel arrays in the vision scanning cameras, leaving blind spots or stripes in the vision data mapping the surface of the workpiece.

Apart from any interference between the profile and vision scanner light sources affecting the vision scanner cameras, physical interference also occurs because the bottom view of the workpiece in the scanner, that is, the view looking upwardly at the lower surface of the workpiece is partially occluded by the parallel spaced-apart chainways or other forms of transfers carrying the workpiece. One solution takes advantage of the lateral offset between the infeed and the outfeed transfers. Typically the infeed transfer translates the workpiece through the scanner frame, and immediately downstream of the scanner frame the infeed hands-off to the outfeed transfer. In order for there to be a smooth transition of the workpiece from the infeed to the outfeed, the adjacent ends of the infeed and outfeed are laterally offset from one another and may be staggered for example in the case of chainways so as to overlap in the downstream direction. Thus the workpiece is physically carried on the outfeed transfer before being dropped from the end of the infeed transfer to assure a smooth transition. This arrangement of the infeed transfer laterally offset, for example staggered, relative to the outfeed transfer provides an opportunity to mount, for example profile scanning cameras which are offset and corresponding lights to minimize interference between profiling and vision scanners; and, secondly, offset relative to one another in the downstream direction to remove interference between the chainways and the vision scanning of the lower surface of the workpiece.

In scanning technology, as profile scan density increases, the increased scan density may preclude transfers being located between profile points simply due to tight density. In order to preclude occlusions of profile points it is an object to provide the occlusion-less scanning of the present invention also for profile scanning.

In a further embodiment of the present invention, which is not intended to be limiting, for each vision scanning camera a pair of generally linear, oppositely disposed arrays of light emitting diodes (LEDs) are mounted on opposite sides of the corresponding camera. The LED's in the pair of arrays may be each independently switched on and off, for example by the use of corresponding dip switches, so that the light intensity distribution on either side of each camera in the array of vision scanning cameras may be tuned to produce the desired increase in lighting intensity towards the extremities of the field of view of each camera, thereby reducing the complexity of the time-consuming task in the prior art of tuning the intensity of the banks of halogen lights to adjust and optimize their light intensity distribution. Although it may be that LED lighting will allow occlusion-less scanning with relative ease of design, it is understood that LED lighting is not required as other forms of lighting also work. For example, fluorescent or halogen lighting as is currently used may also be configured to work.

In summary, the present invention may be characterized in one aspect as including a lumber scanner for sequentially scanning a series of lumber workpieces translating in a downstream flow direction wherein the workpieces flow sequentially to the scanner on an infeed transfer such as a parallel array of infeed conveyors and sequentially from the scanner on an outfeed transfer such as a parallel array of outfeed conveyors, and across an interface between the infeed and outfeed transfers wherein:

a) the workpieces are each conventionally oriented with their long axes transverse to the direction of flow of workpieces in the downstream direction, b) a scanner frame is mounted or mountable transversely across the flow direction generally at the interface between the infeed and outfeed transfers so that the series of lumber workpieces pass through a cavity defined by the frame as the workpieces flow in the flow direction to transition between the infeed and outfeed transfers, the downstream end of the infeed transfer laterally adjacent an upstream end of the outfeed transfer so as to create an overlap zone between the downstream end of the infeed transfer and the upstream end of the outfeed transfer c) a first scanner camera downstream and adjacent the downstream end of the infeed transfer, a second scanner camera upstream and adjacent the upstream end of the outfeed transfer, the first scanner camera having a first field of view and second scanner camera having a second field of view, the first and second fields of view collectively covering laterally across the overlap zone so that a workpiece translating downstream through the overlap zone while on the downstream end of the infeed transfer has a second portion of the workpiece within the second field of view, and wherein as the workpiece continues to translate downstream so as to pass onto the upstream end of the outfeed transfer a first portion of the workpiece contiguous with the second portion of the workpiece passes through the first field of view, d) wherein the first and second cameras generate corresponding first and second images of the first and second portions of the workpiece for transmitting the images to a processor for generating a collective image of the first and second portions of the workpiece.

In one preferred embodiment the scanner cameras include upper and lower arrays of scanner cameras and upper and lower scanner lights mounted or mountable to upper and lower portions of the frame the lower scanner cameras and the lower scanner lights mounted or mountable below the infeed and outfeed transfers.

The lower array of scanner cameras and corresponding lower scanner lights may be staggered across the overlap zone so that a first sub-array of the lower array is mounted between downstream-most ends of the infeed transfer, and so that a second sub-array of the lower array, is mounted between upstream-most ends of the outfeed transfer, so that for example for every second camera and light unit, corresponding fields of view of the scanner cameras corresponding to the lower array are not occluded by the infeed or outfeed conveyors.

Advantageously the scanner cameras of the lower array are vision cameras. The lower scanner lights may be LED light arrays, for example substantially linear spaced apart arrays of LEDs. Oppositely arranged pairs of the arrays of LEDs may be mounted aligned transversely across the flow direction and generally parallel to the frame. The oppositely arranged ends of the arrays of LEDs may laterally overlap corresponding ends of next adjacent pairs of the arrays of LEDs.

The at least one upper array and the at least one lower array may include lateral arrays of both profiling cameras and vision cameras and their corresponding the scanner lights.

The lateral arrays of LED lights may be mounted to the frame both above and below the flow path of the workpieces in the flow direction through the cavity. The lights may be aligned so as to illuminate, respectively, upper and lower surfaces of the workpieces as the workpieces pass through the cavity, and may be inclined from the vertical to also illuminate edges of the workpiece. The lateral arrays of LED lights may include four banks of the lateral arrays of LED lights, including two upper banks and two lower banks each angled towards substantially a center of the cavity.

In one embodiment the upper array of scanner cameras and corresponding upper scanner lights and the lower array of scanner cameras and corresponding lower scanner lights include:

a) profiling cameras and corresponding lights mounted within the cavity and positioned to provide differential thickness measurement of the workpieces passing through the cavity; and, b) vision cameras and corresponding lights mounted to at least one side of the frame.

The scanner system according to the present invention may also be characterized as including a plurality of scanners cooperating with a corresponding plurality of radiation sources. The scanners and radiation sources collectively are spatially separated in a transverse direction relative to a workpiece flow direction. The scanners have overlapping fields of view and produce scanned image data for processing by image processing software. The spatial separation allows removal by the image processing software of portions of the image data. The portions which are removed include images of interfering transport mechanisms which interfere with unobstructed images of workpieces carried in the flow direction by the transport mechanisms.

In one embodiment the present invention also includes a processor and in particular an image processor having the image processing software. The software includes means for combining the image data from the scanners by delaying spatially the image data from a first scanner so as to join together the image data from the first scanner with the image data from a second scanner which is spatially separated in the transverse direction. The joining of the image data from the first and second scanners removes overlap between the images to obtain a complete and unobstructed image of the workpiece.

A frame may be mounted so as to extend at least partially transversely around the flow direction. The plurality of scanners and the corresponding plurality of radiation sources may be mounted to the frame in a laterally spaced array transversely across the flow direction.

The plurality of radiation sources include at least one array of light emitting diodes. Means, cooperating with the arrays of light emitting diodes, may be provided for selectively adjusting the intensity of emitted light. In one embodiment the light emitted from individual light emitting diodes amongst or including all of the LEDs may be selectively adjusted so as to provide a custom intensity distribution.

Advantageously, the arrays of light emitting diodes include oppositely arranged pairs of arrays of light emitting diodes mounted so as to be substantially transversely aligned across the flow direction and substantially parallel to the frame. The ends of adjacent arrays in the pairs of light emitting diodes may overlap.

The present invention also includes a scanning method which includes the steps of:

a) providing a plurality of scanners and a corresponding plurality of cooperating radiation sources which collectively are spatially separated in a transverse direction relative to a workpiece flow direction and wherein the plurality of scanners have overlapping fields of view, b) producing corresponding scanned image data from the plurality of scanners and transmitting the data for processing by image processing software, c) removing by the image processing software, portions of the image data which include images of interfering transport mechanisms which interfere with unobstructed images of workpieces carried in the flow direction by the transport mechanisms.

The method may further include the steps of providing a processor including an image processor having the image processing software, and combining the image data from the plurality of scanners by delaying spatially the image data from a first scanner so as to join together the image data from the first scanner with the image data from a second scanner, wherein the first and second scanners are the spatially separated in the transverse direction. The step of joining of the image data from the first and second scanners includes the step of removing overlap between the image data from the first and second scanners to obtain an unobstructed image of the workpiece.

BRIEF DESCRIPTION OF THE DRAWINGS

FIG. 1c is a cross sectional view along line 1c-1c in FIG. 1a.

FIG. 1d is a sectional view along line 1d-1d in FIG. 1a.

FIG. 2b is the view of FIG. 2a with the light bar mounted to a hanger and pivoting bracket.

FIG. 2c is a side elevation view of FIG. 2b.

FIG. 2d is a plan view of FIG. 2c, partially cut away to show the arrays of LEDs.

FIG. 2e is the hanger, bracket and light bar of FIG. 2b mounted to a scanner frame beam.

FIG. 3a is a further embodiment of the scanner according to the present invention in cross sectional and elevation view.

FIG. 3b is the scanner of FIG. 3a in side elevation view.

FIG. 3c is a sectional view along line 3c-3c in FIG. 3a.

FIG. 3d is a sectional view along line 3d-3d in FIG. 3a.

FIG. 5a is, in cross sectional end elevation view, a further embodiment of the scanner according to the present invention.

FIG. 5b is in cross sectional end elevation view, a further embodiment of the scanner according to the present invention.

DETAILED DESCRIPTION OF EMBODIMENTS OF THE INVENTION

Figure 1A:
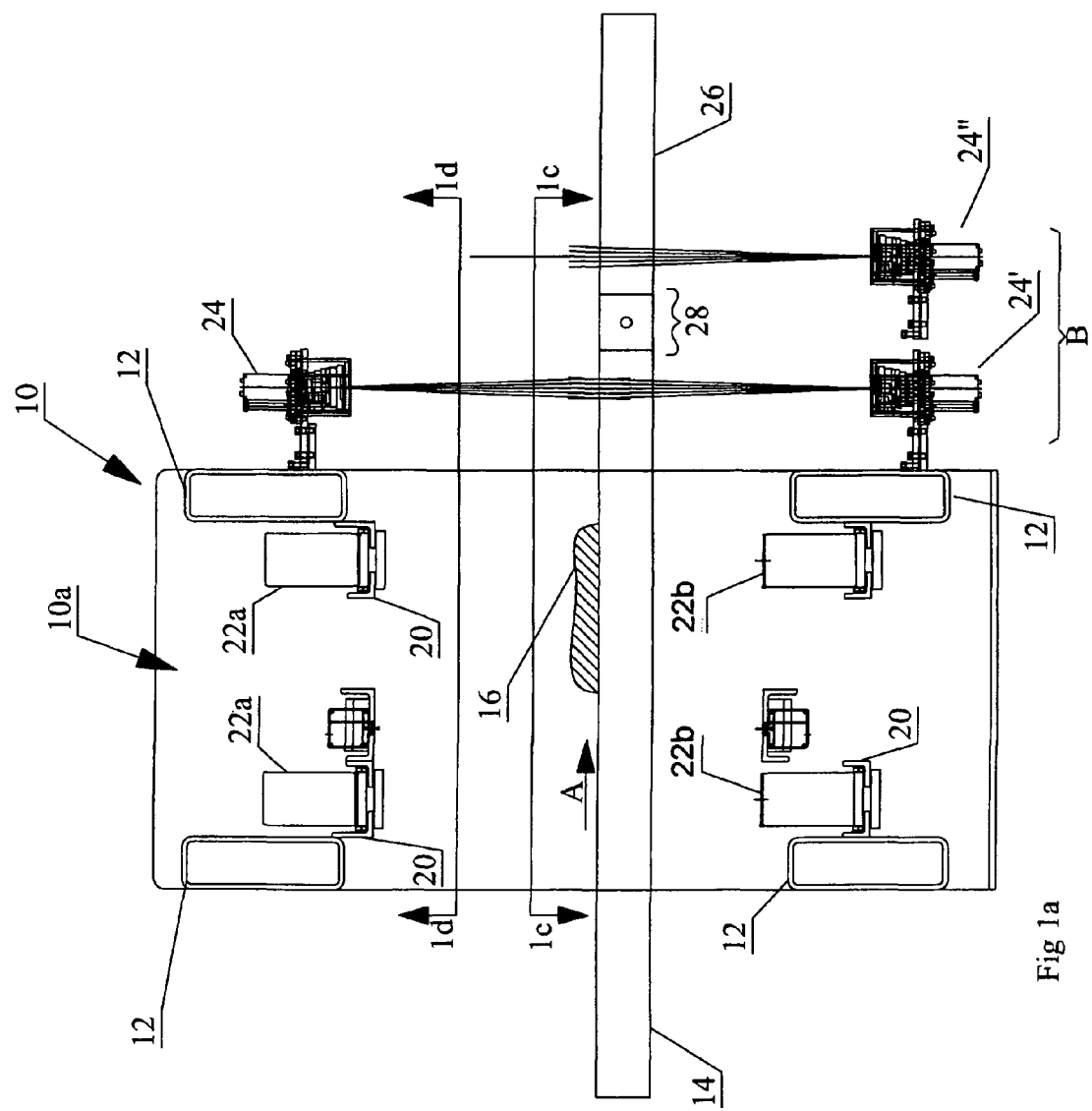
FIG. 1a is a section view along line 1a-1a in FIG. 1b.

In the embodiment of FIGS. 1a-1d, a scanner frame 10 includes upper and lower beams 12 which extend laterally across, respectively over and under, infeed chainways 14 conveying lumber workpieces 16 in flow direction A. Beams 12 are supported at their ends by end columns 18.

Rigid mounting brackets 20 are rigidly mounted to beams 12 so as to support profile cameras 22a and 22b within the cavity 10a defined within frame 10 by beams 12 and end columns 18. Workpiece 16 translates in direction A on infeed 14 between the profile cameras so that the upper profile cameras 22a scan the upper surface profile of workpiece 16 and the lower profile cameras 22b scan the lower surface profile of workpiece 16.

Vision cameras 24 are either rigidly mounted to frame 10 or rigidly mounted adjacent frame 10. They may be mounted immediately downstream of frame 10 as illustrated but may also be located upstream of profile scanners, or alternated upstream and downstream of the profile scanners or cameras (collectively referred to herein as cameras). In the illustrated embodiment the vision cameras are immediately downstream of the fields of view of the profile cameras so as to scan the upper and lower surfaces of workpiece 16 for defects. The lower vision cameras 24' and 24", that is, the vision cameras scanning the lower surface of workpiece 16, may advantageously be laterally offset from one another as best seen in FIG. 1c. The laterally spaced apart array of infeed chainways 14 are parallel to each other and spaced apart at regular intervals across frame cavity 10a. Outfeed chainways 26 are also parallel to each other and laterally spaced apart at regular intervals across frame cavity 10a. The downstream ends of the array of infeed chainways 14 overlap in a scanning zone B seen in FIGS. 1a and 1c in the direction of flow with the upstream ends of the array of outfeed chainways 26 wherein zone B includes the hand-off or transition zone 28 seen in FIG. 1a across which a workpiece 16 is handed off from the infeed chainways 14 onto the outfeed chainways 26.

A first sub-array of vision cameras 24' and corresponding light bars 30' mounted transversely on either side of their corresponding vision cameras 24', are mounted between the downstream ends of infeed chainways 14. A second sub-array of vision cameras 24" and their corresponding light bars 30", also mounted transversely on either side of their corresponding vision cameras 24", are mounted between the upstream ends of outfeed chainways 26. Vision cameras 24' and 24" are mounted within scanning zone B on opposite sides of transition zone 28 so that the field of view of vision cameras 24' are not occluded by the upstream ends of outfeed chainways 26 or by the downstream ends of infeed chainways 14, and the fields of view of vision cameras 24" are not occluded by the upstream ends of outfeed chainways 26 or the downstream ends of infeed chainways 14. Consequently, a workpiece 16 translating in direction A sequentially over the first sub-array of vision cameras 24' and the second sub-array of vision cameras 24" have their lower surfaces completely scanned by the combination of the scanning by both vision cameras 24' and 24". The video data from the vision cameras may then be combined into a collective image by a processor (not shown) to provide an occlusionless mapping of the features of the lower surface of workpiece 16, for example, for use in data processing to extract defect information for use in defect classification and prediction.

Because only the lower surfaces of workpieces 16 are occluded by the infeed and outfeed chainways, the field of view of vision cameras 24 mounted to the downstream upper beam 12 of frame 10 do not have their downwardly looking field of view occluded so that only a single linear array of vision cameras 24 and their corresponding light bars 30 are needed to map the features of the upper surface of workpieces 16. However, this is not intended to be limiting as the top 'vision' scanners may follow the bottom configuration of vision scanners for ease of mounting purposes, or for aesthetics, or for cost effective mounting etc.

Figure 1B:
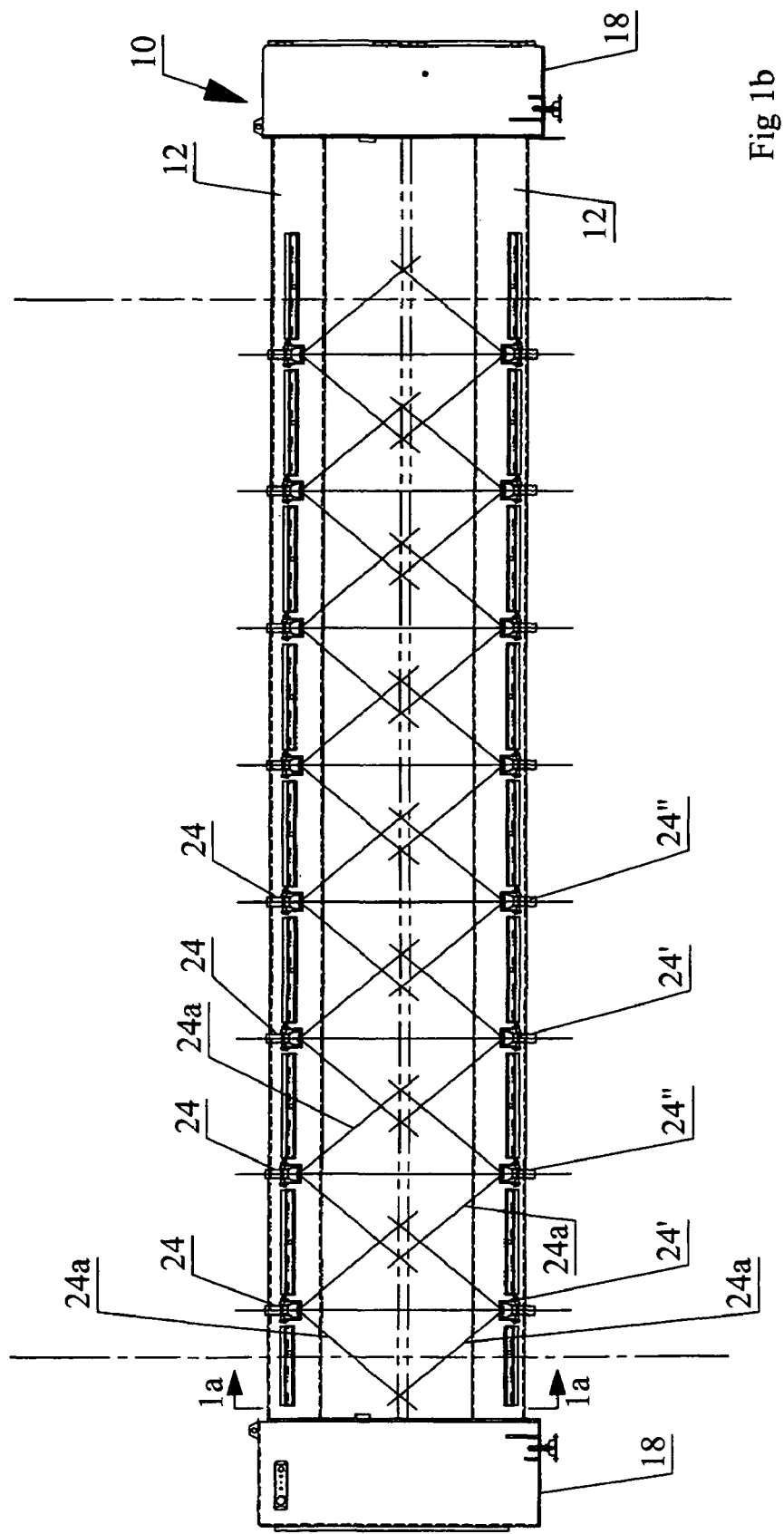
FIG. 1b is the scanner according to one embodiment of the present invention in front elevation partially cut away view.
Figure 1C:
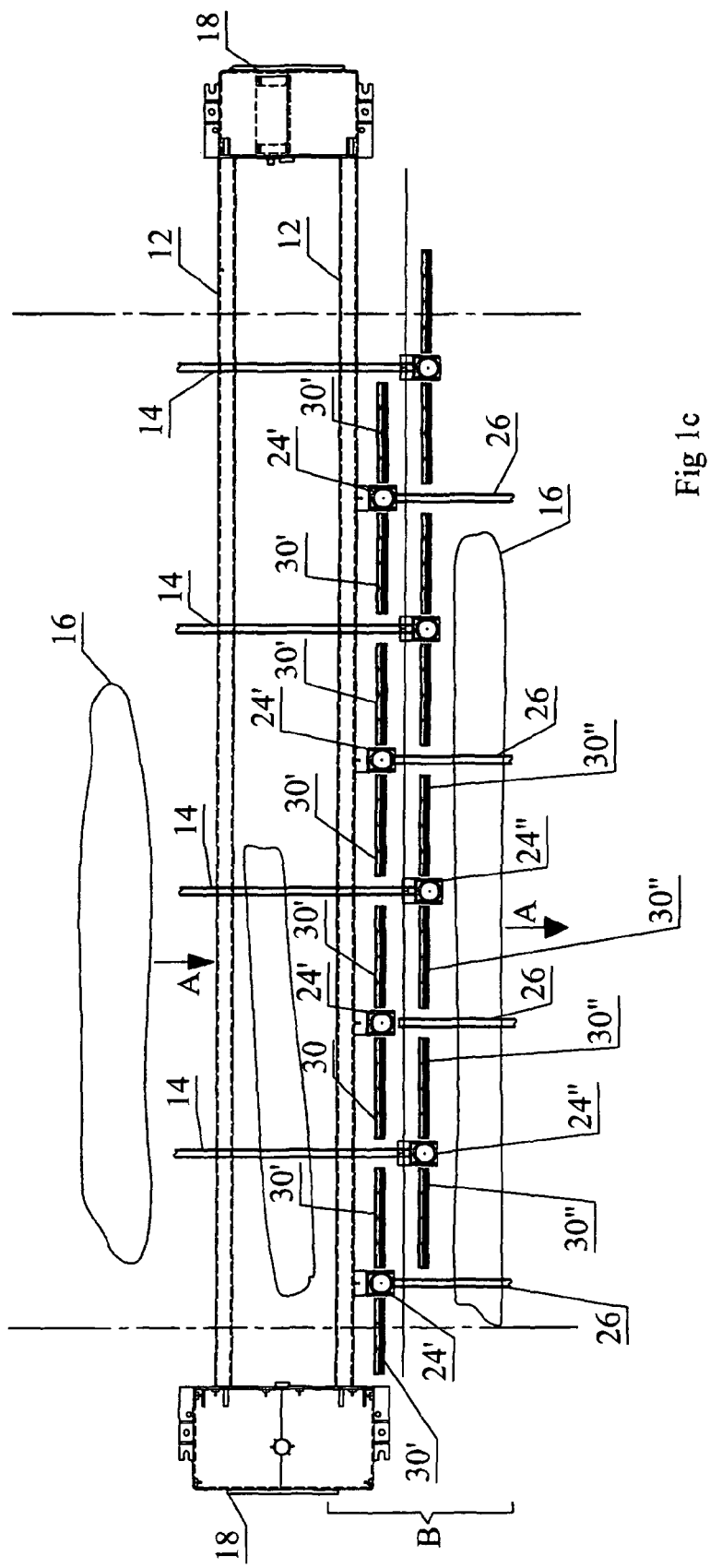
Figure 1D:
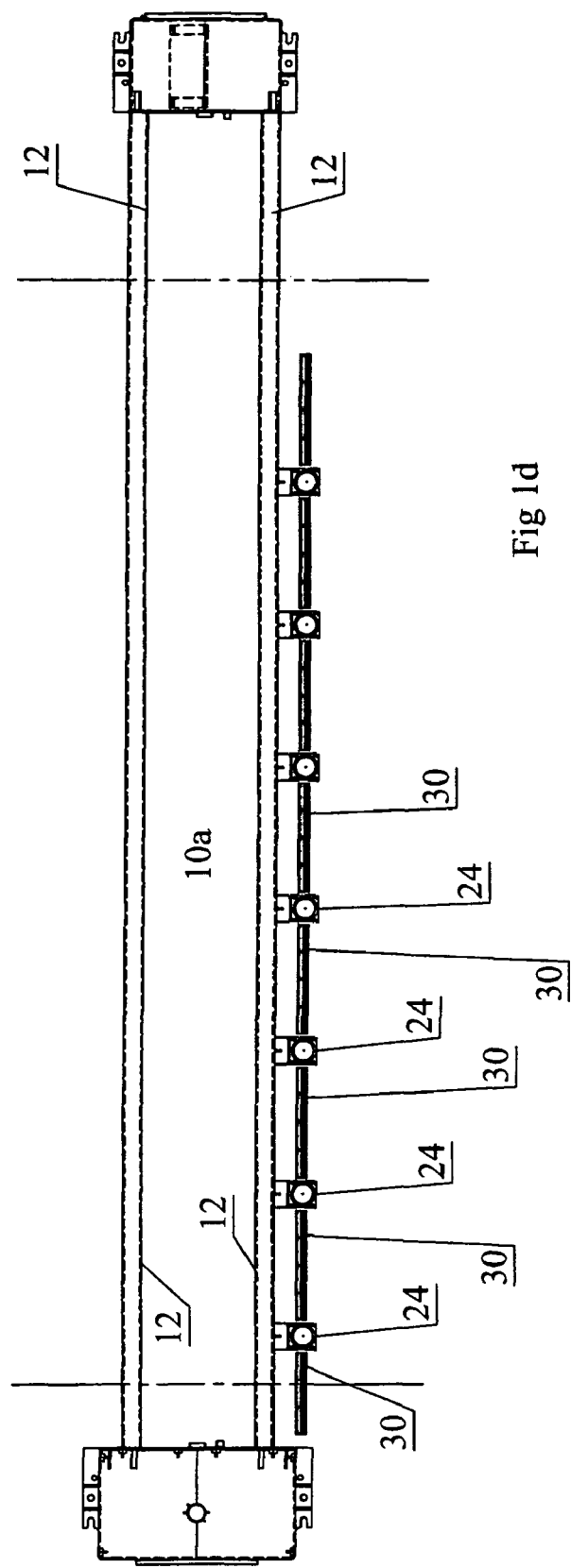
Figure 2A:
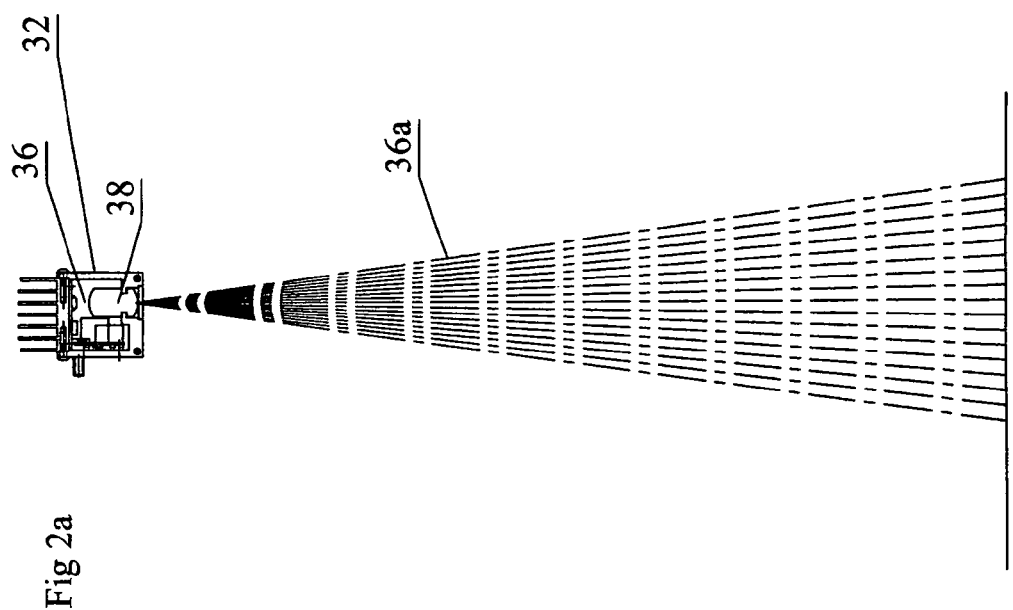
FIG. 2a is, in cross sectional end elevation view, an LED light bar according to one aspect of the present invention.
Figure 2F:
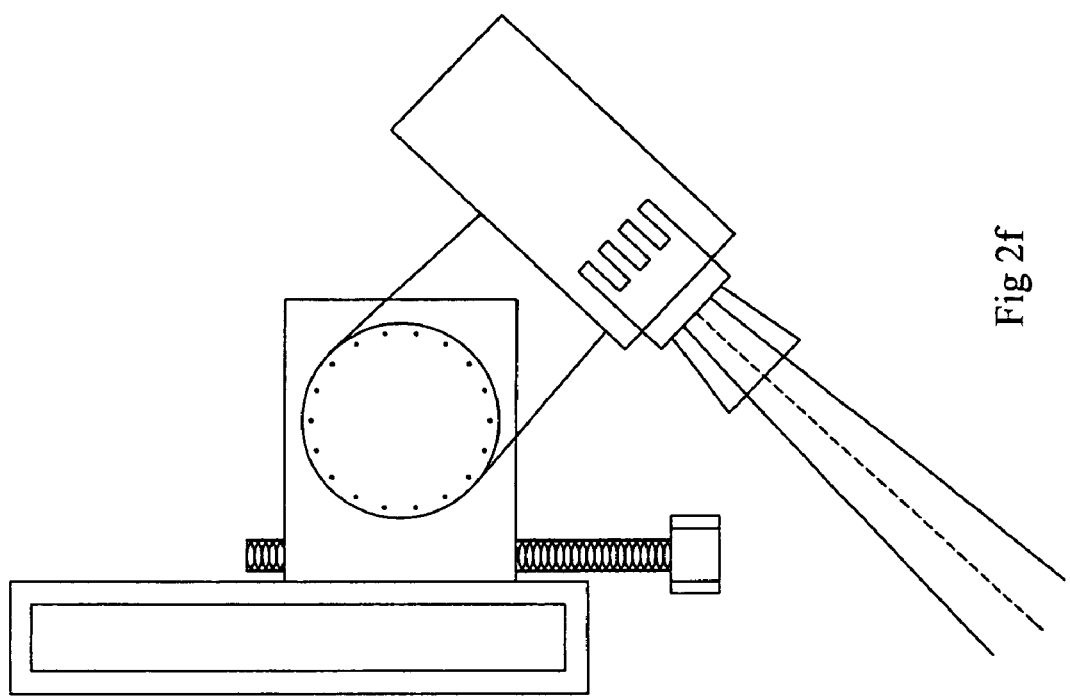
FIG. 2f is an alternative embodiment of the pivotable light bar of FIG. 2e.

As best seen in FIG. 1b, the fields of view 24a of vision cameras 24, 24' and 24" may be vertically aligned when looking at frame 10 in front elevation view.

As seen in FIGS. 2a-2f, light bars 30, 30' and 30", indicated collectively in FIGS. 2a-2e by reference numeral 30, may have in one embodiment not intended to be limiting, mounted within elongate light housing 32, linear arrays 34 of closely spaced LEDs 36, each LED 36 projecting a light beam 36a through infinite lens 38. Each LED 36 may be switched "on" or "off" by the actuation of a corresponding dip switch (not shown) located within light housing 32 and accessible through dip switch access ports 40. The intensity of the illumination within the profiling camera fields of view 24a may thus be adjusted using the dip switches so as to provide greater light intensity at the outer extremities of the field of view and less light intensity towards the center of the fields of view directly underneath the corresponding cameras.

Light bars 30 may be mounted to beams 12 by the use of hanger brackets 42 to which light bars 30 are pivotally mounted by hinges 44. Housings 30 may thus be pivoted relative to beams 12. Narrow beam LED sources may align with the vision scanner mounting system, so that if one is moved, they all are moved, that is pivot and/or adjust vertically and/or horizontally as seen by way of example in FIGS. 2e and 2f.

Figure 3C:
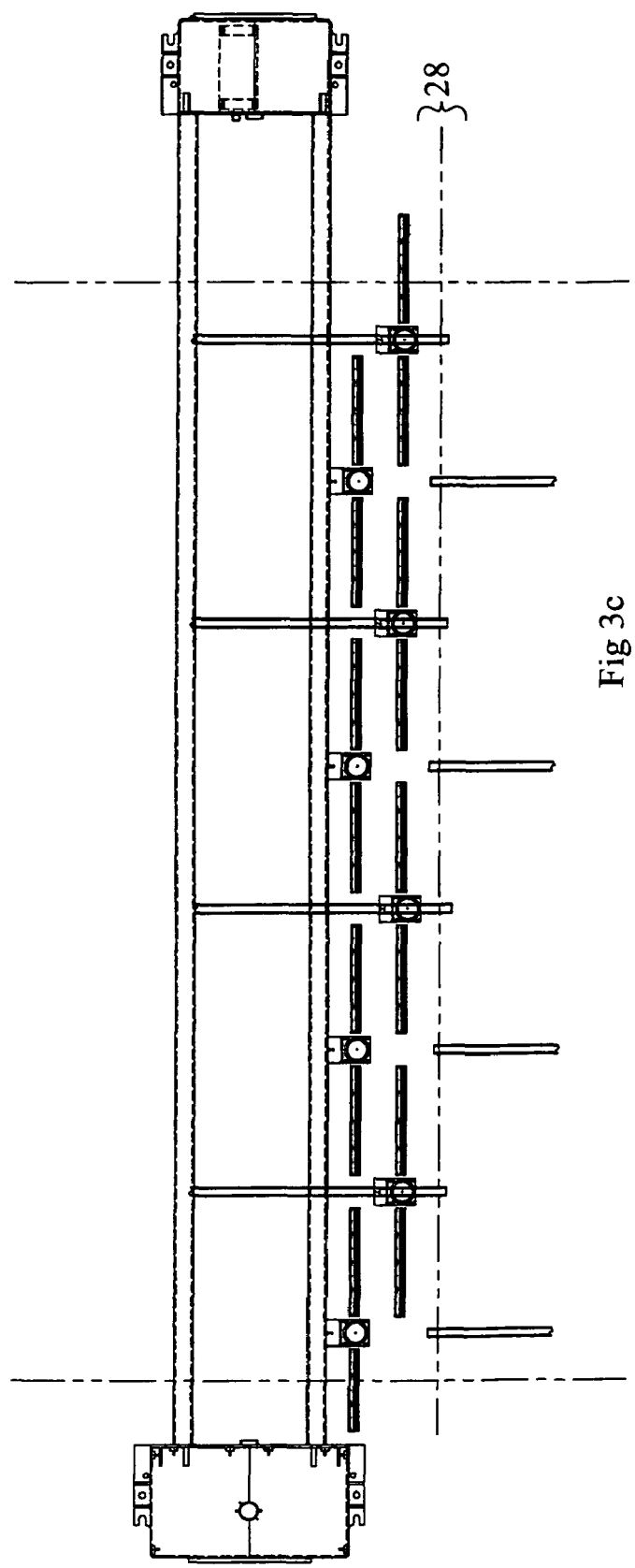

This type of mounting system would be for an 'in-line' or 'in-axis' lighting/vision scanner configuration. In FIG. 3a, vision cameras 24, 24' and 24" are angled from the vertical along with their corresponding light bars 30 for use, for example, when it is desired to scan not only the upper and lower surfaces 16a and 16b respectively of workpiece 16 but also the front and rear edges 16c and 16d respectively.

Figure 4:
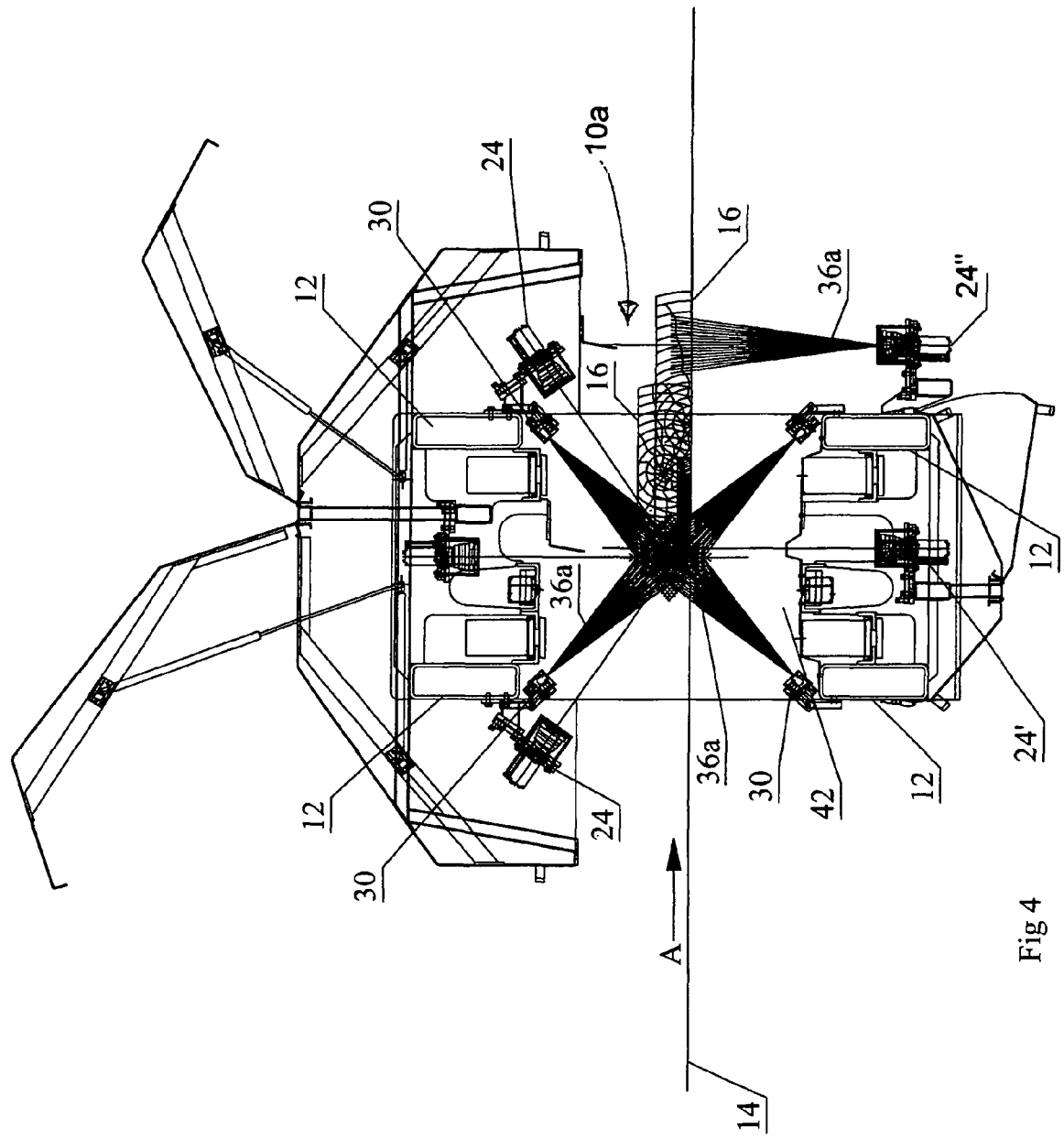
FIG. 4 is, in cross sectional end elevation view, a further embodiment of the scanner according to the present invention housed within a clamshell cowling.

Alternatively, in the embodiment of FIG. 4, the upper and lower surfaces and front and rear edges of workpiece 16 are viewed by vision cameras 24' and 24 mounted, respectively between the lower of beams 12, and the outer sides of the upper of beams 12 and canted inwardly so that their fields of view cover the passage of workpieces 16 through cavity 10a on infeed chainways 14. Light bars 30 may be mounted underneath beams 12, pivoted on hinges 44, hanger brackets 42 mounted directly to beams 12. In this case, because the linear arrays 34 of LEDs 36 are not in line with cameras 24 as in the embodiments of FIGS. 1a and 3a, light beams 36a may be wider that is, diverge greater than light beams 36a for use where light bars 30 are in line with cameras 24. In the embodiment of FIG. 4, only the upper cameras 24 are inclined inwardly into cavity 10a. Alternatively, the lower camera 24" for viewing the lower surface of workpiece 16 may be mounted to the outside of a lower downstream beam 12 and are oriented vertically upwards.

Retro-fit embodiments are illustrated in FIGS. 5a and 5b, where vision cameras 24 are retro-fit mounted to conventional scanner frames 10 containing conventional profiling cameras 22.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A scanner system comprising:
 a plurality of scanners cooperating with a corresponding plurality of radiation sources which collectively are spatially separated in a transverse direction relative to a workpiece flow direction, wherein said plurality of scanners have overlapping fields of view, and wherein said plurality of scanners produce corresponding scanned image data for processing by image processing software, whereby said spatial separation allows removal by the image processing software of portions of said image data which include images of interfering transport mechanisms which interfere with unobstructed images of workpieces carried in said flow direction by said transport mechanisms; and
 a processor including an image processor having the image processing software, wherein said software includes means for combining said image data from said plurality of scanners by delaying spatially said image data from a first scanner of said plurality of scanners so as to join together said image data from said first scanner with said image data from a second scanner of said plurality of scanners, wherein said first and second scanners are said spatially separated in said transverse direction, and wherein said joining of said image data from said first and second scanners removes overlap therefrom to obtain a complete and unobstructed image of the workpiece.

2. The system of claim 1 further including a frame mounted so as to extend at least partially transversely around said flow direction, wherein said plurality of scanners and said corresponding plurality of radiation sources are mounted to said frame in a laterally spaced array transversely across said flow direction.

3. The system of claim 1 wherein said plurality of radiation sources include at least one array of light emitting diodes.

4. The system of claim 3 further comprising means, cooperating with said at least one array of light emitting diodes, for selectively adjusting the intensity of light emitted from said at least one array.

5. The system of claim 4 further comprising means for selectively adjusting the intensity of light emitted from individual light emitting diodes in said at least one array, so as to provide a custom intensity distribution.

6. The system of claim 5 wherein said means for selectively adjusting the intensity of said individual light emitting diodes includes means for selectively adjusting the intensity of light emitted from all of said individual light emitting diodes in said at least one array.

7. The system of claim 3 wherein said at least one array of light emitting diodes includes oppositely arranged pairs of arrays of light emitting diodes mounted so as to be substantially transversely aligned across said flow direction and substantially parallel to said frame.

8. The system of claim 7 wherein said at least one array of light emitting diodes include a plurality of said pairs of light emitting diodes, and wherein ends of adjacent arrays of said pairs of light emitting diodes overlap.

9. A scanner system for sequentially scanning a series of workpieces translating in a downstream flow direction sequentially to the scanner on an infeed conveyor and sequentially from the scanner on an outfeed conveyor across an interface between the infeed conveyor and the outfeed conveyor, wherein a downstream end of the infeed conveyor is laterally adjacent so as to laterally overlap an upstream end of the outfeed transfer and so as to thereby define an overlap zone between the downstream end of the infeed conveyor and the upstream end of the outfeed conveyor, the scanner system comprising:

at least one pair of scanner cameras and corresponding at least one scanner radiation source for irradiating the workpiece at a radiation frequency detectable by said at least one pair of scanner cameras, said at least one pair of scanner cameras mounted adjacent said infeed and outfeed conveyors, and wherein said at least one pair of scanner cameras includes both a first camera adjacent the downstream end of the infeed conveyor, and a second camera adjacent the upstream end of the outfeed conveyor so that said second camera is upstream of said first camera, said first camera having a corresponding upwardly directed first field of view and second camera having a corresponding upwardly directed second field of view wherein said second field of view is upstream of and substantially parallel to said first field of view, said first and second fields of view collectively extending substantially entirely laterally across said overlap zone, whereby a workpiece translating downstream across the interface and through said overlap zone while on said downstream end of said infeed transfer has a second portion of said workpiece within said second field of view so as to be scanned by said second camera, and wherein as said workpiece continues to translate downstream so as to pass onto said upstream end of said outfeed transfer a first portion of said workpiece adjacent said second portion of said workpiece passes within said first field of view so as to be scanned by said first camera, said first and second cameras generating corresponding first and second images of corresponding said first and second portions of said workpiece for transmitting to a processor for generating a collective image of said first and second portions of said workpiece.

10. The device of claim 9 wherein the workpieces are each oriented with their long axes transverse to the direction of flow of workpieces in the downstream direction, and wherein a scanner frame is mounted across the flow direction adjacent the interface between the infeed and outfeed conveyors so that the series of lumber workpieces pass through a cavity defined by said frame as the workpieces flow in the flow direction and across the interface between the infeed and outfeed conveyors, at least one upper scanner camera and corresponding at least one upper scanner radiation source is mounted to an upper portion of said frame above said cavity, and wherein said at least one upper scanner camera is at least one upper array of scanner cameras and wherein said at least one scanner camera is at least one lower array of scanner cameras.

11. The device of claim 10 wherein said lower scanner lights are light emitting diodes light arrays.

12. The device of claim 11 wherein said light emitting diodes light arrays include substantially linearly aligned, spaced apart arrays of light emitting diodes, and further comprising means for selectively adjusting light intensity distribution along said arrays of light emitting diodes.

13. The device of claim 12 wherein said array of light emitting diodes are oppositely arranged pairs of said arrays of light emitting diodes mounted aligned transversely across said flow direction and generally parallel to said frame.

14. The device of claim 13 wherein each pair of said pairs of said arrays of light emitting diodes have oppositely arranged ends, and wherein said oppositely arranged ends laterally overlap corresponding said ends of next adjacent said pairs of said arrays of light emitting diodes.

15. A scanning method comprising:
a) providing a plurality of scanners and a corresponding plurality of cooperating radiation sources which collectively are spatially separated in a transverse direction relative to a workpiece flow direction and wherein said plurality of scanners have overlapping fields of view;
b) producing corresponding scanned image data from said plurality of scanners and transmitting said data for processing by image processing software;
c) removing by the image processing software, portions of said image data which include images of interfering transport mechanisms which interfere with unobstructed images of workpieces carried in said flow direction by said transport mechanisms;
d) providing a processor including an image processor having the image processing software; and
e) combining said image data from said plurality of scanners by delaying spatially said image data from a first scanner of said plurality of scanners so as to join together said image data from said first scanner with said image data from a second scanner of said plurality of scanners, wherein said first and second scanners are said spatially separated in said transverse direction, and wherein said step of joining of said image data from said first and second scanners includes the step of removing overlap between said image data from said first and second scanners to obtain an unobstructed image of the workpiece.

16. The method of claim 15 further comprising the step of providing a frame mounted so as to extend at least partially transversely around said flow direction, and providing said plurality of scanners and said corresponding plurality of radiation sources mounted to said frame in a laterally spaced array transversely across said flow direction.

17. The method of claim 16 wherein said plurality of radiation sources include at least one array of light emitting diodes, and further comprising the step of selectively adjusting the intensity of light emitted from said at least one array.

18. The method of claim 17 wherein said step of selectively adjusting the intensity of light includes selectively adjusting the intensity of light emitted from individual light emitting diodes in said at least one array, so as to provide a custom intensity distribution.

19. The method of claim 17 further comprising the step of providing said at least one array of light emitting diodes in oppositely arranged pairs of arrays of light emitting diodes mounted so as to be substantially transversely aligned across said flow direction and substantially parallel to said frame.

20. The method of claim 19 further comprising the step of providing said at least one array of light emitting diodes as a plurality of said pairs of light emitting diodes, and providing overlapping ends of adjacent arrays of said pairs of light emitting diodes overlap.

* * * * *

UNITED STATES PATENT AND TRADEMARK OFFICE
CERTIFICATE OF CORRECTION

PATENT NO. : 7,751,612 B2  Page 1 of 1
APPLICATION NO. : 11/544565
DATED : July 6, 2010
INVENTOR(S) : Lyle Baker et al.

It is certified that error appears in the above-identified patent and that said Letters Patent is hereby corrected as shown below:

Column 10

Line 14, "...The device of claim 9 ..." should read --... The system of claim 9....--.

Line 30, "...The device of claim 10 ..." should read --... The system of claim 10....--.

Line 32, "...The device of claim 11 ..." should read --... The system of claim 11....--.

Line 37, "...The device of claim 12 ..." should read --... The system of claim 12....--.

Line 41, "...The device of claim 13 ..." should read --... The system of claim 13....--.

Signed and Sealed this
Tenth Day of April, 2012

David J. Kappos
*Director of the United States Patent and Trademark Office*